(12) United States Patent
Maes

(10) Patent No.: US 10,528,995 B2
(45) Date of Patent: Jan. 7, 2020

(54) USE OF MARKETPLACE PLATFORM INSTANCES FOR RESELLING

(71) Applicant: HEWLETT PACKARD ENTERPRISE DEVELOPMENT LP, Houston, TX (US)

(72) Inventor: Stephane Herman Maes, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 560 days.

(21) Appl. No.: 15/344,068

(22) Filed: Nov. 4, 2016

(65) Prior Publication Data

US 2018/0130106 A1 May 10, 2018

(51) Int. Cl.
*G06Q 30/00* (2012.01)
*G06Q 30/06* (2012.01)

(52) U.S. Cl.
CPC ..... *G06Q 30/0605* (2013.01); *G06Q 30/0603* (2013.01)

(58) Field of Classification Search
CPC ................................................ G06Q 30/06–08
USPC ............................................... 705/26.1–27.2
See application file for complete search history.

(56) References Cited

U.S. PATENT DOCUMENTS

| 2010/0042720 | A1* | 2/2010 | Stienhans | G06F 9/5072 709/226 |
| 2015/0127531 | A1 | 5/2015 | Dimmler et al. | |
| 2015/0161681 | A1 | 6/2015 | Maes | |
| 2016/0125489 | A1* | 5/2016 | Gupte | G06Q 30/0603 705/26.61 |

(Continued)

OTHER PUBLICATIONS

"Appdirect Adds Reseller Management Service to Its Platform, Solves Channel Pain Points in Selling Cloud Services," Dec. 3, 2014, pp. 1-5, AppDirect.

(Continued)

*Primary Examiner* — Ethan D Civan

(57) ABSTRACT

An example method may include creating multiple instances of a marketplace platform, using a first instance of the marketplace platform to aggregate multiple catalogs of service vendors into an aggregated catalog of the first instance, and additional instances of the marketplace platform (reseller instances) to aggregate the aggregated catalog of the first instance (or the aggregated catalog of another reseller instance) into the aggregated catalog of the respective reseller instance into the aggregated catalog of the respective reseller instance. Each instance of the marketplace platform may be such that, when it is run by processing circuitry, it aggregates input catalogs into an aggregated catalog of the respective instance. Each instance of the marketplace platform may also include a customer portal that is to present offerings of the corresponding aggregated catalog for sale to users. The method may further include onboarding resellers and associating separate instances of the marketplace platform (the reseller instances) with the onboarded resellers, respectively. The method may further include, in response to a given offering being purchased via the customer portal of one of the reseller instances, causing one of the instances of the marketplace platform to orchestrate fulfillment of the given offering.

19 Claims, 6 Drawing Sheets

(56) References Cited

U.S. PATENT DOCUMENTS

| | | | |
|---|---|---|---|
| 2016/0180418 A1* | 6/2016 | Jaeger | G06Q 10/067 705/26.43 |
| 2016/0203533 A1 | 7/2016 | Cheng et al. | |
| 2018/0097706 A1 | 4/2018 | Prashant | |

OTHER PUBLICATIONS

Admin, "Creating Reseller Templates and Offers," Jul. 16, 2014, pp. 1-5, Flexiant Cloud Orchestrator Documentation, v4.0.8.
Joshua Beil, "The Importance of Syndicating Cloud Services," Aug. 4, 2010, pp. 1-5, Cloud Computing.
Ryan Reed, "Cloud Services Brokerage: Five Models That Help You Capture the Cloud," May 20, 2014, pp. 1-6, NTT Data, Inc.

* cited by examiner

USE OF MARKETPLACE PLATFORM INSTANCES FOR RESELLING

BACKGROUND

Service vendors may develop and offer for sale (for a price or for free) various services, which may include, for example, cloud services (e.g., Software as a Service (SaaS), Infrastructure as a Service (IaaS), Platform as a Service (PaaS), etc.), information technology (IT) services, telecom/broadband/mobile services, and so on). See below for a more detailed definition of "service vendor". Service vendors may create an electronic catalog that includes various offerings corresponding to services that the service vendor is offering for sale. Customers of the service vendors may use a computing device to access the electronic catalog via a corresponding access portal to purchase services offered therein.

DETAILED DESCRIPTION

Figure 1:
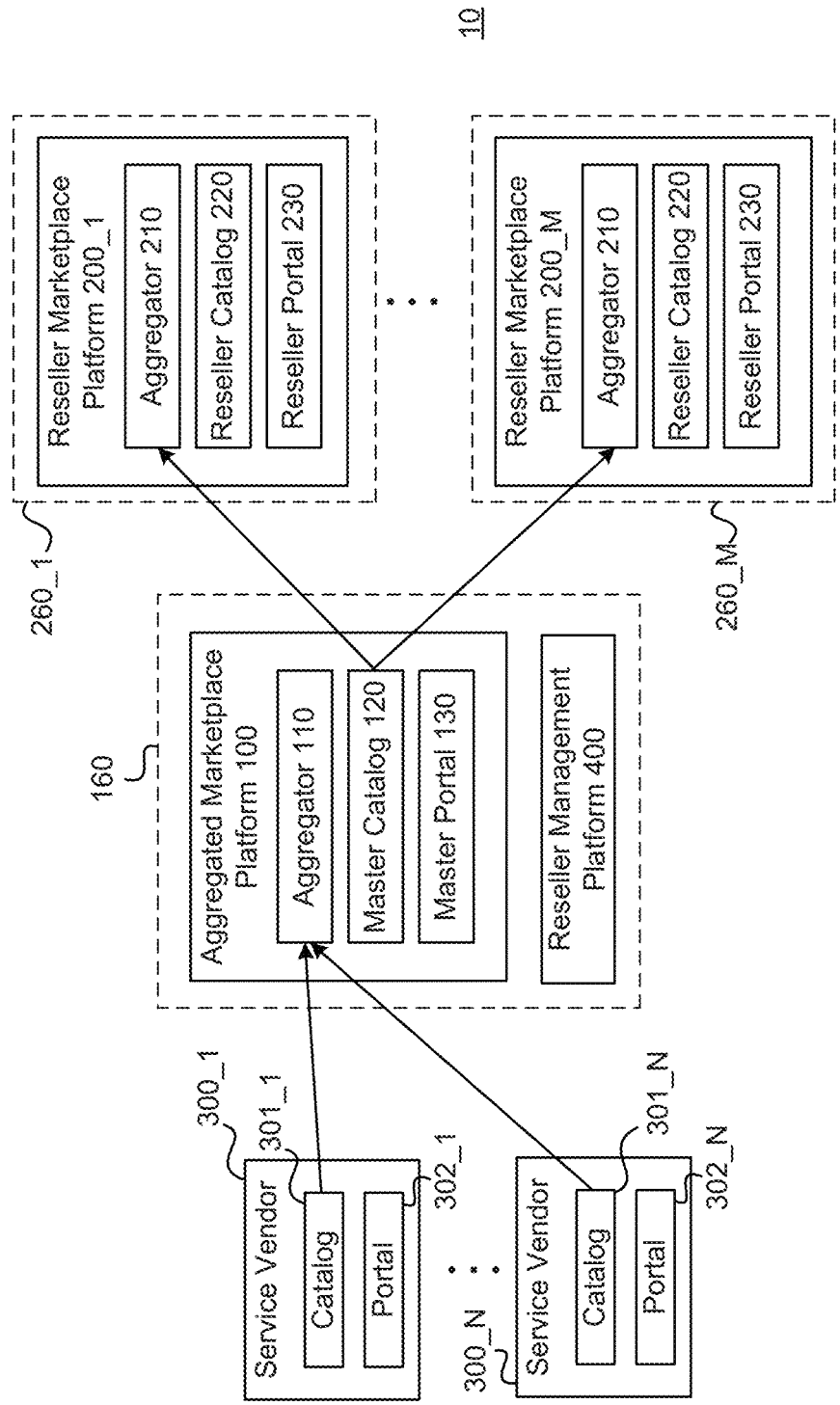
FIG. 1 illustrates an example system that includes an example aggregated marketplace platform, example reseller marketplace platforms, and an example reseller management platform.

There may be numerous different service vendors offering numerous types of services, and the numbers continue to grow, particularly as small vendors (such as independent software vendors (ISVs), developers, SaaS providers, etc.) proliferate. Each such service vendor may have their own individual catalog of offerings, and each may have their own customer portal through which their catalog may be accessed and their services may be purchased. As such, customers shopping for such services may need to access multiple portals to find, compare, and ultimately purchase such services. Moreover, many service vendors, especially small vendors (such as some ISVs), may have difficulty exposing customers to their offerings.

An aggregated services-marketplace may be established wherein a customer may be presented the offerings of multiple service vendors at a single location, which may make it easier for customers to shop for services and for vendors to offer such services. Such an aggregated services-marketplace may be established by running a platform that aggregates individual catalogs of multiple service vendors into a master catalog. See below for a definition of "platform". The platform may then present the offerings of the master catalog to customers via a master customer portal, and orchestrate fulfillment of purchases. Examples of platforms that, when run, establish such aggregated services-marketplaces and details regarding how individual catalogs may be aggregated into an master catalog are described in US Patent Application Publication No. 2015/0161681 A1 and US Patent Application Publication No. 2016/0125489 A1, the contents of both of which are incorporated herein by reference in their entireties. Hereinafter, a platform that is to aggregate one or more input catalogs into a master catalog and provide a customer portal for customers to access the catalog may be referred to as a "marketplace platform".

Example systems described herein build upon the systems described above by, among other things, providing support in the systems for third-party reselling. In particular, in certain examples described herein, third-party reselling may be supported by providing multiple instances of a marketplace platform, namely: a first instance for forming an aggregated services-marketplace (hereinafter referred to variously as "the first instance" or an "aggregated marketplace platform") and an additional instance for each reseller (hereinafter referred to as a "reseller instance" or a "reseller marketplace platform"), where each reseller marketplace platform is dependent on the aggregated marketplace platform. Specifically, in certain examples, the aggregated marketplace platform may aggregate disparate service vendor catalogs into its master catalog, and each instance of the reseller marketplace platform may aggregate the master catalog of the aggregated marketplace platform or the master catalog of another reseller instance into its own master catalog. Hereinafter, the master catalog of the aggregated marketplace platform may be referred to as a "master catalog" and the master catalog of a reseller instance may be referred to as a "reseller catalog". Thus, reselling may be supported in the system by using a hierarchy of aggregation, namely: service vendor catalogs are aggregated into the master catalog which is then aggregated into a reseller catalog (which may be aggregated into a reseller catalog of a second level reseller, and so on).

As used herein, "aggregating" a catalog or a group of catalogs means aggregating at least one offering from the catalog or from the group of catalogs into another catalog. As used herein "aggregating" a given offering of a first catalog into a second catalog means creating a corresponding offering in the second catalog that thereafter has a synchronization link with the given offering in the first catalog. Examples of such aggregating are described in US Patent Application Publication No. 2015/0161681 A1 (for example, paragraphs [0015]-[0018], [0021]-[0022]) and US Patent Application Publication No. 2016/0125489 A1 (for example, paragraphs [0017]-[0026]).

An operator of an aggregated services-marketplace (hereinafter "marketplace operator") may desire to enable third-party reselling for a variety of reasons. For example, resellers may be able to specialize in addressing particular industries, market segments, or even specific customers, and therefore may be better positioned to sell to these customers. As another example, the marketplace operator may use resellers that have different sales tactics or business models, which may provide the market operator greater diversification in the market. As another example, the market operator may desire to build a business model in which they sell services (such as syndicated content, platforms, hosting, etc.) to other businesses who resell the services (a sort of wholesaler-retailer type business model).

As noted above, in certain examples, the reseller marketplace platform and the aggregated marketplace platform may be two distinct instances of the same marketplace platform. In other words, in certain examples, machine readable instructions that constitute the reseller marketplace platform may be substantially identical to machine readable instructions that constitute the aggregated marketplace platform. However, the reseller marketplace platform and the aggregated marketplace platform may differ from one another in how they are deployed (for example, the platforms may be run on different infrastructure, connected to different inputs and/or outputs, may be deployed at different locations, may have different settings, etc.). Furthermore, in certain examples, discrete instances of an already existing marketplace platform (such as the "service broker 200" and/or "service exchange 250" described in US 2015/0161681 A1 and/or the "marketplace system 200" described in US 2016/0125489 A1) may be used as the aggregated marketplace platform and the each reseller marketplace platform. In such examples, existing machine readable instructions may be leveraged in forming the marketplace platforms, thus reducing the time and cost to implement the example systems.

In addition, in certain examples, a separate instance of the reseller marketplace platform may be associated with each reseller. For example, the platforms may be established as distinct instances of virtual appliances, as distinct instances of containers or sets of containers, as distinct installations of computer programs on the same or different computer(s), etc. Thus, if there are multiple resellers, each reseller may have its own separate reseller marketplace platform. This configuration automatically provides for multitenancy. In addition, in certain examples such a configuration may be implemented efficiently on shared infrastructure, such as in a cloud of the operator of the aggregated services marketplace.

In addition, the reseller instances may be created statically or dynamically. Statically creating a reseller instance means creating the reseller instance and then keeping it instantiated over an extended period of time, perhaps even when it is not being used. For example, statically creating a reseller instance for a reseller may include instantiating a virtual appliance for the reseller and keeping the virtual machine thereof in existence over time even when no one is using it. Another example of statically creating a reseller instance for a reseller may include installing a reseller instance in a dedicated server. Dynamically creating a reseller instance means creating a reseller instance for a given reseller on-the-fly when it is needed (e.g., when a customer attempts to access the reseller's portal) and then tearing down the instance when it is not needed, which may result in reseller instances being repeated created and torn down over time for the same reseller.

It should be noted that the service vendors may also be selling their services directly to customers, in addition to having their catalogs aggregated into the marketplace operators catalog. For example, each service vendor may have its own marketplace that draws from the service vendor's catalog. Similarly, the marketplace operator may continue to sell services directly to customers from its aggregated services-marketplace (i.e., it does not have to sell solely to resellers). Moreover the marketplace operator may itself be a service vendor, and may sell its own services in its own marketplace and/or include its own services in its master catalog for being aggregated into a reseller's catalog. Similarly, a reseller may also be a service vendor, and may sell its own services in its own alongside the offerings that were aggregated from the marketplace operator.

Furthermore, each instance of the marketplace platform (both the first instance and the reseller instances) may aggregate from other catalogs in addition to those that are specified above. For example, the first instance may aggregated the catalog of another aggregated marketplace in addition to aggregating the service vendors' catalog. As another example, a reseller instance may aggregate a service vendor's catalog in addition to aggregating the master catalog of the first instance. As another example, a reseller instance may aggregate the reseller catalog of another reseller.

Moreover, services that have been purchased may be hosted or run by any entity, which may include the service vendor that produced the service, the marketplace operator, a reseller, or another third-party (e.g., a service provider). Moreover, the service may be hosted or run on premises, or off premises (for example in a public cloud). For example, if the marketplace of the entity includes a cloud marketplace controller, then the services may be run as a cloud application on a cloud.

[Example Systems]

Figure 2:
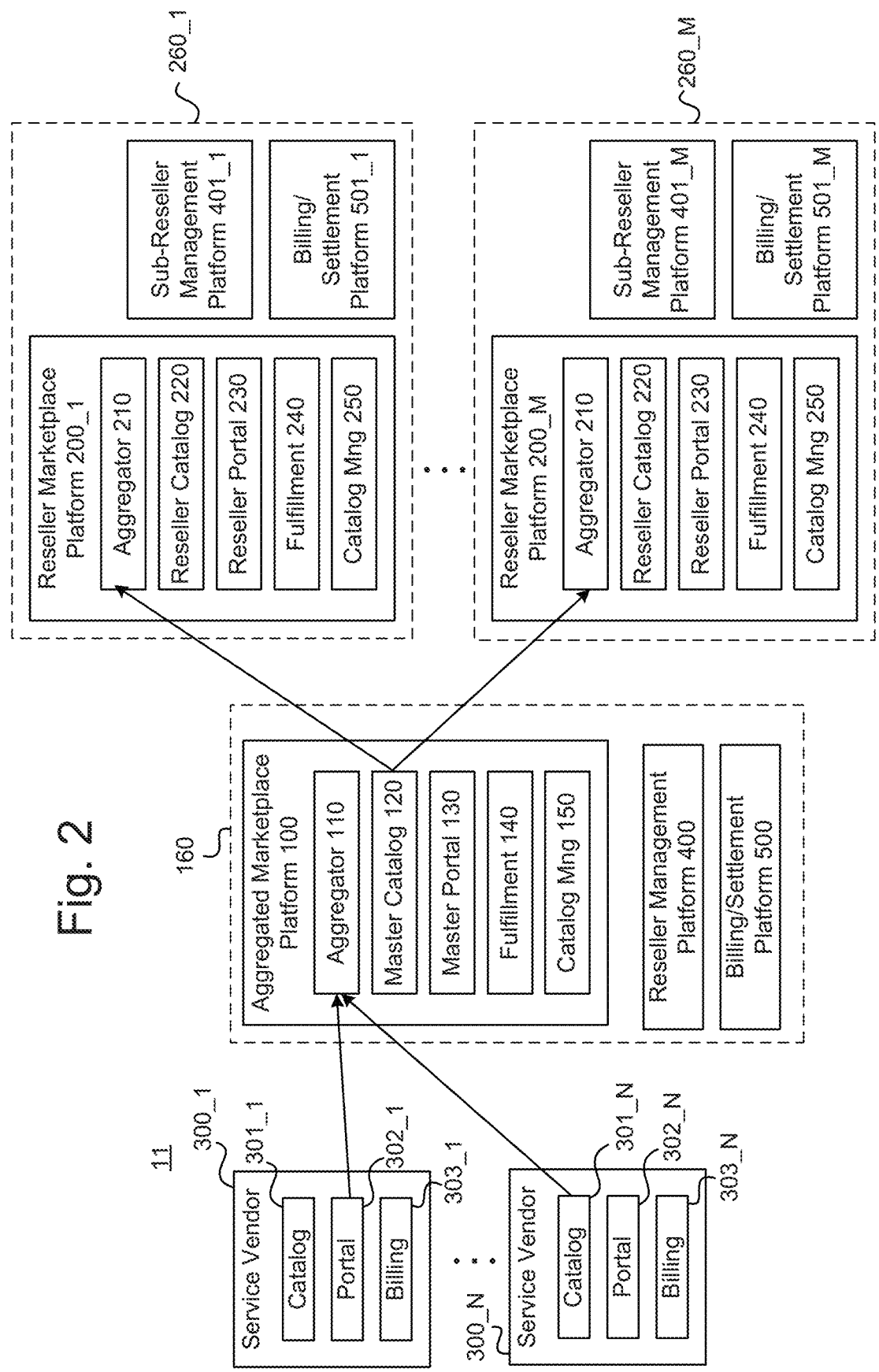
FIG. 2 illustrates another example system that includes an example aggregated marketplace platform, example reseller marketplace platforms, an example reseller management platform, and an example billing/settlement platform.

FIG. 1 illustrates an example system 10 and FIG. 2 illustrates an example system 11. The example system 11 is a more specific example of the example system 10. Thus, overlapping features will be described with respect to the system 10 and duplicative description thereof with respect to the system 11 will be omitted.

The example system 10 includes a first instance of a marketplace platform that is used as an aggregated marketplace platform 100, and a number of additional instances of the marketplace platform that are used as reseller instances—namely reseller marketplace platforms 200_1 to 200_M. The example system 10 also includes a reseller management platform 400. The example system 11 may further include billing/settlement platforms 500, 501, and 303, and sub-reseller management platforms 401.

The aggregated marketplace platform 100 and the reseller marketplace platforms 200 may all be instances of a same marketplace platform. For example, the aggregated marketplace platform 100 and the reseller marketplace platforms 200 may be instances of existing marketplace platforms, such as "service broker 200" and/or "service exchange 250" described in US 2015/0161681 A1 and/or the "marketplace system 200" described in US 2016/0125489 A1. The aggregated marketplace platform 100 may be configured to aggregate catalogs 301 of service vendors 300 into its master catalog, which is referred to herein as the master catalog 120, while the reseller marketplace platforms 200 may be configured to aggregate the master catalog 120 into their respective master catalogs, which are referred to herein as reseller catalogs 220.

The aggregated marketplace platform 100 and the reseller management platform 400 may be hosted on infrastructure 160. In examples that include the billing/settlement platform 500 (such the example system 11), this may also be hosted on the infrastructure 160. The instances of the reseller marketplace platform 200_1 through 200_M are hosted on the infrastructure 260_1 through 260_M, respectively. Each of the infrastructures 160 and 260_1 through 260_M may include, for example, processing circuitry (e.g., a number of processors), machine readable storage media (e.g., memory), and so on. Moreover, although the infrastructures 160 and 260_1 through 260_M are illustrated and described separately, some or all of the infrastructures 160 and 260_1 through 260_M may share the same underlying physical hardware (e.g., the same processing circuitry, etc.). Moreover, each of the infrastructures 160 and 260_1 through 260_M may include virtualized hardware and/or non-virtualized ("bare-metal") hardware, and may also include operating systems (partial or complete), hypervisors, container controllers, and the like as needed depending on the deployment model.

The aggregated marketplace platform 100 and the reseller management platform 400 may be operated by the same entity, which may be referred to hereinafter as the marketplace operator. In this context, "operating" means controlling and managing the platform, but does not necessarily imply that the platform is run on the premises of the operator. For example, while the aggregated marketplace platform 100 may be hosted on premises of the marketplace operator (e.g., the infrastructure 160 is owned by the marketplace operator), it may also be hosted off premises (e.g., the infrastructure 160 is a cloud provided to the marketplace operator by a third-party) and managed remotely by the marketplace operator.

Similarly, the reseller marketplace platforms 200 may be, but do not necessarily have to be, hosted on infrastructure of the marketplace operator—that is, the infrastructures 260_1 through 260_M may be, but do not have to be, owned by the marketplace operator. For example, some or all of the reseller marketplace platforms 200 may be hosted on shared infrastructure in a cloud of the marketplace operator. As another example, some or all of the reseller marketplace platforms 200 may be hosted on infrastructure of their respective reseller—e.g., the reseller associated with reseller platform 200_1 owns the infrastructure 260_1, and so on. As another example, some or all of the reseller marketplace platforms 200 may be hosted on infrastructure of a third-party. For example, the marketplace operator may provide software corresponding to the reseller management platform 400 to the reseller (e.g., via download), who may then install/run the platform 400 on infrastructure of their choosing (their own, or a third-party's). In certain examples, the aggregated marketplace platform 100, the reseller management platform 400, and the reseller marketplace platforms 200 are all hosted on shared infrastructure in the same cloud. Instances of the aggregated marketplace platform 100 and instances of the reseller marketplace platforms 200 may be statically created, or dynamically created, as described above.

In certain examples, each instance of the reseller marketplace platform 200 may be a separate instance of a virtual appliance that may be run on virtualized hardware (e.g., via a hypervisor). A virtual appliance is a virtual machine image, comprising a specific application stack installed in a virtual machine and packaged into an image. A virtual appliance may be executed or run by a virtualization platform such as a hypervisor without the platform having to configure the virtual machine, install the application stack, and the like. In certain other examples, each instance of the reseller marketplace platform 400 may be a separate instance of a container or a separate instance of a set of containers. A container is a discrete virtualized entity that, unlike some virtual machines, may not contain a full instance of an operating system, but instead may contain merely an application (or set of applications) together with some settings, storage, and the like. A container may be executed or run by a container platform, which may share certain portions of an operating system among the multiple containers it is running. In some examples, the instances of the reseller marketplace platform 200 may be hosted as distinct instances of virtual appliances or as distinct instances of containers or sets of containers on the same shared infrastructure, such as a cloud of the marketplace operator.

The aggregated marketplace platform 100 and the reseller management platform 400 are under the control of the marketplace operator, at least in the sense that the marketplace operator is able to control the operation thereof of and set policies therefor (e.g., via a catalog management platform 150 as illustrated in FIG. 2). The reseller marketplace platforms 200 may be partially controlled by the marketplace operator and partially controlled by the reseller. In particular, the marketplace operator may control (or set bounds for) certain policies of the reseller marketplace platforms 200 via the reseller management platform 400, such as specifying which offers may be aggregated, which terms may set or altered, and so on. In addition, the marketplace operator may exercise control over the reseller marketplace platforms 200 in that the marketplace operator can control whether or not an instance of the aggregated marketplace platform 200 is associated with a particular reseller. In certain examples, the marketplace operator may also control whether or not an instance of the reseller marketplace platform 200 exists (i.e., marketplace operator may control the creation, maintenance, and/or tearing down of instances the reseller marketplace platform 200). On the other hand, the resellers may also control certain aspects of their respective instances of the reseller marketplace platform 200 (within bounds set by the reseller management platform 400), such as setting policies, managing their catalog, managing down-stream resellers, and so on. In certain examples, the reseller may also control whether or not their instance of the reseller marketplace platform 200 exists (i.e., reseller may control the creation, maintenance, and/or tearing down of their instance of the reseller marketplace platform 200).

Additional levels of resellers (e.g., resellers of resellers) could also be included in the system 10 by adding a new instance of the marketplace platform for each downstream reseller, with the downstream reseller's instance of the marketplace platform being dependent on a previous level's reseller marketplace platform. For example, a second-level reseller may be supported by using an instance of the marketplace platform as a second-level reseller marketplace platform (e.g., platform 202 in see FIG. 3), which aggregates the reseller catalog 220 of one of the first level reseller marketplace platforms (e.g., platform 200_1 in FIG. 3). There is no limit to the number of levels of resellers that can be included.

In certain examples, service vendors 300 may also have an instance of the marketplace platform associated therewith. For such service vendors 300, their vendor catalog 301 may be the aggregated catalog of their corresponding instance of the marketplace platform. The aggregated catalog of such an instance of the marketplace platform may aggregate the offerings of the corresponding service vendor 300, and it may also aggregate catalogs from other entities (e.g., other service vendors 300).

Figure 3:
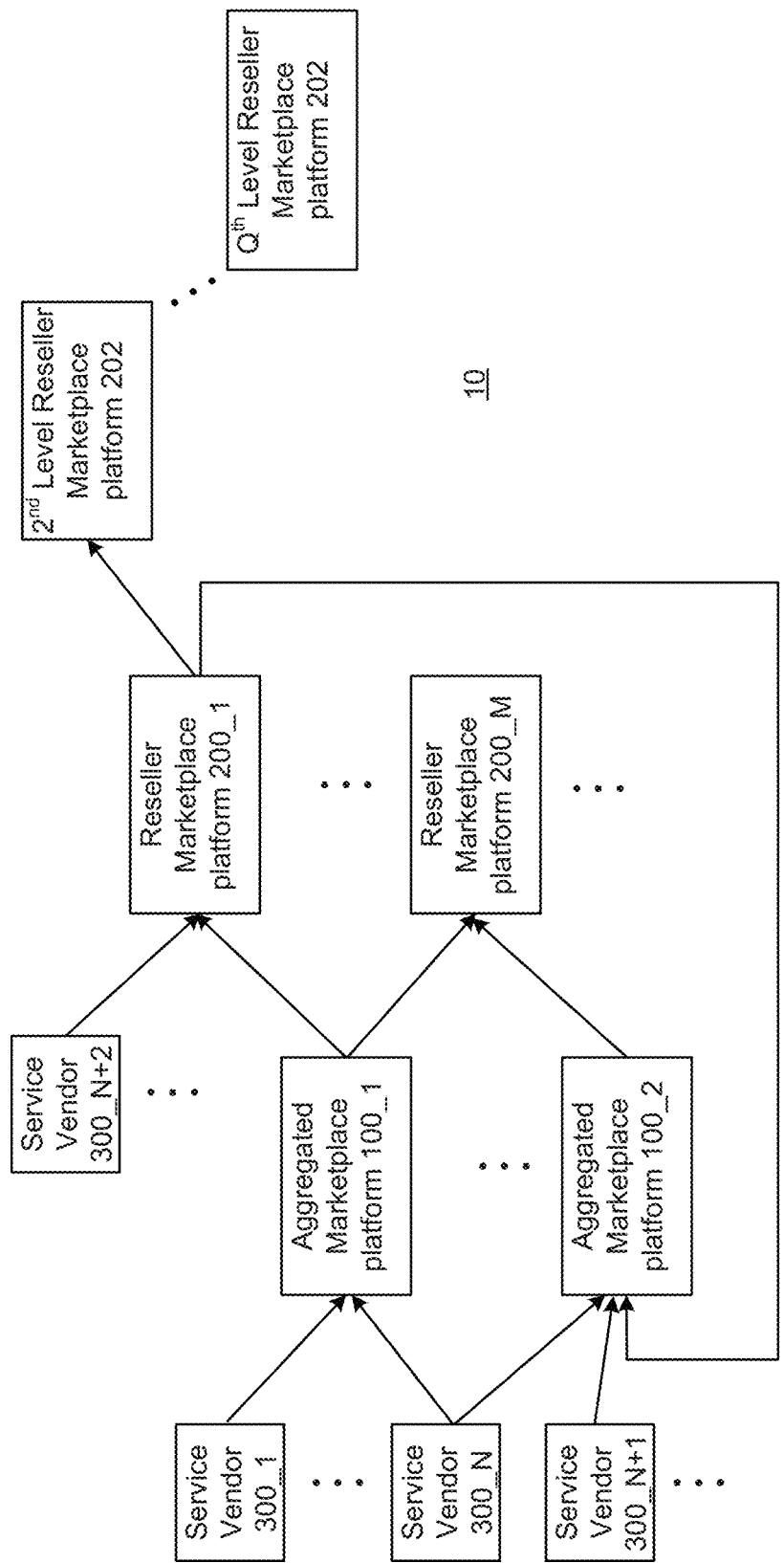
FIG. 3 illustrates an example system that includes multiple aggregated marketplace platforms and multiple levels of reseller marketplace platforms.

Moreover, each entity in the system 10 may play multiple roles, and the fact that an entity is referred to herein as performing a particular role should not be interpreted to mean that the entity cannot also perform other roles. For example, an entity may aggregate service vendor catalogs 301, and thus may be considered a marketplace operator in that context, but the same entity may also aggregate an master catalog 120 of another marketplace operator, and thus may be considered a reseller in that context. As another example, a marketplace operator or a reseller may offer their own services in their catalog (in addition to the offerings that were aggregated from other catalogs), and thus may be considered a service vendor in that context. FIG. 3 shows some examples of how entities may play multiple roles, but is by no means exhaustive of the variety of interactions that can be accommodated.

[Example Catalogs and Aggregation]

The system 10 may be in communication with the electronic catalogs 301 of a number of service vendors 300 (service vendors 300_1 to 300_N in FIG. 1). Each of the catalogs 301 may include various offerings. As used herein, an "offering" is an item in a catalog that corresponds to a distinct service or combination of services that are offered for sale, and may include an identification of the service or combination of services (e.g., name, identification number, etc.), description of characteristics of service(s), commercial terms (e.g., price, licensing conditions, etc.), aggregation policy information (e.g., whether aggregation of the item is permitted, etc.), resale policy information (e.g., whether resale of the item is permitted, conditions associated with resale, etc.), and other metadata. For example, see US 2015/0161681 A1 (for example, paragraphs [0012]-[0013]) and US 2016/0125489 A1 (for example, paragraph [0026]) for further types of information that may be included in an offering.

The offerings may include offerings for any type of service offered by a service vender 300. Examples of services that may be offered include SaaS, IaaS, PaaS, packaged cloud solutions or designs (which may comprise a recipe or blue print specifying resources and/or how those resources may be configured and combined together so as to address a specific type of application or use-case), IT services, telecommunication/broadband/mobile services, and so on. As an example of the packaged cloud solutions referred to above, see the "designs 120" described in U.S. patent application Ser. No. 15/282,355 titled "EXCHANGE SERVICE MANAGEMENT CONTENTS WITH A CLOUD ENTITY VIA A SELF-CONTAINED CLOUD CONTENT PACKAGE", the contents of which are incorporated herein by reference in their entirety. The offerings, once purchased, may be provided by a service provider, which may or may not be the same entity as the service vendor 300. Thus, for example, the offerings may include syndicated content.

The aggregator 110 of the aggregated marketplace platform 100 aggregates the catalogs 301 into the master catalog 120, and the aggregators 210 of the reseller marketplace platforms 200 aggregate the master catalog 120 into their respective reseller catalogs 220. As noted above, "aggregating" a catalog or a group of catalogs means aggregating at least one offering from the catalog or from the group of catalogs into another catalog, while "aggregating" a given offering of a first catalog into a second catalog means creating a corresponding offering in the second catalog that thereafter has a synchronization link with the given offering in the first catalog. If the second catalog does not yet exist when the aggregating is performed, the second catalog may be created as part of the aggregating. Although "aggregating" when used in ordinary speech may imply that there are multiple things that are being grouped together, this is not necessarily the case as the term is used herein; for example, it is possible for a single catalog (or a single offering of a catalog) to be aggregated as the term is used herein. A synchronization link between offerings in two catalogs is an enduring relationship that causes at least some content of the offerings to be synchronized (in one direction or both directions) either episodically (e.g., in batches) or automatically whenever the content is changed. For example, see US 2015/0161681 A1 (for example, paragraphs [0015]-[0018], [0021]-[0022]) and US 2016/0125489 A1 (for example, paragraphs [0017]-[0026] for more details regarding how aggregating may be performed, including details regarding synchronization links.

Thus, because the catalogs 301 are aggregated into the master catalog 120, the master catalog 120 may include offerings that correspond to and are synchronization linked with offerings from the catalogs 301. Not necessarily every offering in the catalogs 301 needs to have a corresponding offering in the master catalog 120, and vice versa. For example, the service vendor 300 may control which offerings of their catalog 301 the aggregated marketplace platform 100 is permitted to aggregate. As another example, the aggregated marketplace platform 100 does not necessarily have to aggregate every offering that it is permitted to, but instead may select offerings for aggregation from among those that it is permitted to aggregate based on polices set by the marketplace operator (e.g., via a catalog management platform 150). In addition, the marketplace operator may add its own offerings to the master catalog 120 (e.g., the marketplace operator's own offered services) and/or may create new offerings by bundling other offerings. Moreover, in certain examples the service vendors 300 may set additional policies for offerings that are permitted to be aggregated, such as whether the offerings can be resold by a third-party, whether any commercial terms (such as price) may be changed by the marketplace operator and/or resellers, a range of prices that may be set, revenue sharing policies, whether the offering may be bundled, whether content of the offering may be changed or hidden, etc. In certain examples, the service vendors 300 may set some such policies via the metadata that is included in the offerings. In certain examples, the service vendors 300 may set some such policies while being onboarded to the aggregated marketplace platform 100, or by communicating with the aggregated marketplace platform 100 after onboarding.

Similarly, because the master catalog 120 is aggregated into each reseller catalog 220, each reseller catalog 220 may include offerings that correspond to and are synchronization linked with offerings from the master catalog 120. However, not necessarily every offering in the master catalog 120 has a corresponding offering in each reseller catalog 220 (and vice versa), and each reseller catalog 220 is not necessarily the same as the others For example, the marketplace operator may control (via the aggregated marketplace platform 100 and/or the reseller management platform 400) which offerings of the master catalog 120 resellers are permitted to aggregate, which may vary from one reseller to another (e.g., some resellers may have more limited access than others). As another example, the reseller marketplace platform 200 does not necessarily have to aggregate every offering that it is permitted to, but instead may select offerings for aggregation from among those that it is permitted to aggregate based on polices set by the reseller (e.g., via a catalog management platform 250). Moreover, in certain examples the marketplace operator may set additional policies for offerings that it permits to be aggregated by resellers, such as whether the offerings can be resold by a down-stream reseller, whether any commercial terms (such as price) may be changed by the reseller and/or down-stream resellers, whether the offering may be bundled, etc. Some such policies may be subject to constraints imposed by agreements with the service vendors 300 and/or policies set thereby. In certain examples, the marketplace operator may set some such policies via the metadata that is included in the offerings. In certain examples, the marketplace operator may set some such policies as part of onboarding the reseller and/or associating an instance of the reseller marketplace platform 200 with the reseller, or by communicating with the instance of the reseller marketplace platform 200 after onboarding.

In addition, the aggregated marketplace platform 100 may, via the catalog management platform 150, add offerings to the master catalog 120 that do not come directly from aggregating the catalogs 301. For example, the marketplace operator may also be a service vendor (i.e. design or develop its own services) and may include its own offerings in the master catalog 120. For example, if the marketplace operator has its own catalog, then the offerings thereof may be aggregated into the master catalog 120 in the same manner as the catalogs 301 are aggregated. As another example, the marketplace operator may create new offerings in the master catalog 120 by bundling other offerings (subject to agreements with or policies set by the service vendors 300). In this context, "bundling" a set of offerings refers to forming a new offering (the "bundle" or "bundled offering") that offers all of the services that were offered in the set of offerings. In certain examples, such bundling may include, for example, bundling offerings from different service vendors 300 into a single bundled offering.

In addition, each reseller marketplace platform 200 may, via the catalog management platform 250, add offerings to the corresponding reseller catalog 220 that do not come directly from aggregating the master catalog 120. For example, a reseller may also be a service vendor and may include its own offerings in the reseller catalog 220. As another example, the reseller may create new offerings in the reseller catalog 220 by bundling other offerings (subject to the control of the reseller management platform 400). As another example, the reseller may be a reseller for other marketplaces besides the marketplace associated with the aggregated marketplace platform 100, and the catalogs of those other marketplaces may be aggregated along with the master catalog 120 into the reseller catalog 220. As another example, a reseller may aggregate catalogs directly from service vendors (in addition to the master catalog 120) into the reseller catalog 220 (i.e., the reseller may also be a marketplace operator).

As mentioned above, in some examples an offering may be synced with another offering (e.g., when the offering of a first catalog is aggregated into a second catalog), but this does not necessarily mean that all of the content that is included in the offering that is synced is necessarily synced with the corresponding offering. Instead, syncing two offerings merely means that at least some portion of the content of the offerings is synced (in one direction or both directions). For example, the identification of the service(s) and the description of the services may be synced. Which content is synced for a given offering, when it is synced, and whether in which direction(s) it is synced, may be set by the service vendors 300, by the marketplace operator via the catalog management platform 150, and/or by the resellers via their respective catalog management platforms 250. For example, if a service vendor 300 is willing to allow the marketplace operator to set their own price for an offering, the price term of the offering in the corresponding catalog 301 will not be synced into the master catalog 120. Furthermore, the fact that content is synced between offerings in two catalogs does not necessarily mean that the same content is also synced between other catalogs—specifically, the fact that certain content of an offering is synced between the catalogs 301 and the master catalog 120 does not necessarily mean that the same content of the same offering is synced between the master catalog 120 and a reseller catalog 220. For example, the marketplace operator may be allowed to set the price term for a given offering in the master catalog 120 (and hence the price is not synced from catalog 301 to master catalog 120), but a reseller might not be allowed to set the price term (and hence the price is synced from master catalog 120 to reseller catalog 220). Moreover, different policies (including policies regarding what content is synced) may be followed for different resellers, as controlled by the reseller management platform 400.

As described above, the marketplace operator and/or the resellers may be able to add new offerings to their catalogs (including bundling), manage offerings in their catalogs (set whether the offering is visible, set access permissions, set whether the offering can be resold, set whether the offering is synced bidirectionally, etc.), and/or alter content of offerings in their catalogs when permitted (set price terms, change description). Such operations may be performed via the catalog management platforms 150/250. The catalog management platforms 150/250 may provide interfaces for the marketplace operator and/or resellers that enable them to provide input to the platforms that causes such operations to be performed and sets parameters thereof.

[Example Portals]

The aggregated marketplace platform 100 may also include a master customer portal 130. The master customer portal 130 may provide an interface by which customers may access the offerings of the master catalog 120. For example, the master customer portal 130 may be configured to cause displayable content to be transmitted to a user, with the content corresponding to offerings in the master catalog 120. The master customer portal 130 may be configured to retrieve content based on user searches and/or to allow browsing of the content by users. For example, the master customer portal 130 may be the "portal 112" described in US 2015/0161681 A1 and/or the "portal platform 212" described in US 2016/0125489 A1.

Each instance of the reseller marketplace platform 100 may include a reseller customer portal 230. Each reseller customer portal 130 may be similar in function to the master customer portal 130, except that it provides access to a corresponding reseller catalog 220 rather than to the master catalog 130.

In certain examples, the interface provided by the customer portals 130/230 may include a graphical user interface (such as a webpage) that users may interact with to search, browse, and purchase offerings (or APIs to expose the same functionality). In such examples, the marketplace operator and/or resellers may be able to customize the look and feel of the graphical user interface. For example the interface provided by the catalog management platforms 150/250 may enable the marketplace operator and/or resellers to customize the graphical user interface. In certain other examples, the interface provided by the customer portals 130/230 may merely provide catalog content information (e.g., via an API), and the marketplace operator and/or resellers may provide separately a graphical user interface display this information.

In certain examples, the customer portals may be part of a cloud controller platform. Examples of such cloud controller platforms include Cloud Service Automation (CSA) by Hewlett Packard Enterprises (HPE) and vRealize by VMware.

[Fulfillment of Purchases]

Once an offering is purchased via the master customer portal 130 or one of the reseller customer portals 230, the offering may be fulfilled. What constitutes fulfillment may depend on the type of service(s) that are part of the offering. For example, fulfilling an IaaS offering may include provisioning the infrastructure (e.g., VMs) that was purchased. As another example, fulfilling a SaaS offering may include establishing an account for and onboarding a tenant (e.g., an enterprise) and then onboarding individual users of the tenant (e.g., employees). Moreover, fulfillment of some offerings may include ongoing management of a service, especially for subscription services.

The aggregated marketplace platform 100 and/or the reseller marketplace platform 200 may be configured to facilitate automatic fulfillment of purchased offerings. In particular, the fulfillment platform 140 and/or the fulfillment platforms 240 may be configured to orchestrate an end-to-end fulfillment of purchased offerings. Such orchestrating fulfillment may include directly fulfilling the offering or indirectly fulfilling the offering. Indirectly fulfilling the offering may include directing the order to another fulfillment system that can complete the fulfillment (such as a fulfillment engine of the corresponding service vendor 300).

The fulfillment platforms 140/240 may be configured to automatically determine whether they are able to directly fulfill an offering that was purchased via the customer portal 130/230 of their respective instance of the marketplace platform, and if not they may pass the order upstream to be fulfilled by another fulfillment platform. For example, if a purchase is made via a reseller customer portal 230, the reseller marketplace platform 200 may fulfill the offering itself if it is able to, and if the reseller marketplace platform 200 is not able to fulfill the order it may pass the order to the aggregated marketplace platform 100 for fulfillment. Similarly, if a purchase is made via the master customer portal 130 of if an order is passed down from one of the reseller marketplace platforms 200, the aggregated marketplace platform 100 may fulfill the offering itself if it is able to, and if the aggregated marketplace platform 100 is not able to fulfill the order it may pass the order to the appropriate service vendor 300 for fulfillment. In certain examples, the fulfillment platforms 140/240 may continue to monitor and manage fulfillment of the offerings even when direct fulfillment responsibility has been passed on to another entity.

Direct fulfillment of the offerings by a fulfillment platform 140/240 may include, for example, causing the entity that operates the fulfillment platform 140/240 to provision the services. This may occur, for example, when the entity that operates the fulfillment platform 140/240 is also the service provider for the purchased services. For example, the fulfillment platform 140/240 may include a cloud controller platform, such as HPE CSA or VMware vRealize for example, which may automatically provision purchased cloud services.

When the purchased offering is a packaged cloud solution or design (such as the "designs 120" described in U.S. patent application Ser. No. 15/282,355) the fulfillment may include provisioning and configuring the resources as specified in the solution, for example in the manner described in in U.S. patent application Ser. No. 15/282,355.

The fulfillment platforms 140/240 may correspond, for example, to the "service exchange 250" described in US 2015/0161681 A1 (see, for example, paragraphs [0030]-[0103]), the "fulfillment instructions 406", "fulfillment instructions 512", and/or "fulfillment engine 210" described in US 2016/0125489 A1 (see, for example, paragraphs [0028]-[0033], [0061], and [0082]), and/or the "fulfillment layer 140" described in U.S. patent application Ser. No. 15/282,355.

In the systems 10 and 11, the location at which services are hosted or the entity that supplies the purchased services is not limited. In particular, a given service may be hosted at or supplied by (A) the service vendor who produced the service and offered it for sale, (B) a service provider who is distinct from the service vendor, (C) the network operator, (D) a reseller, or (E) any combination of the foregoing. Moreover, the offerings included in the catalogs 301, the master catalog 120, and/or the reseller catalogs 220 may include syndicated content. In particular, an offering for syndicated content may be aggregated in the same manner that any other service is aggregated. The fulfillment platforms 140/240 may be configured to orchestrate fulfillment of offerings under all of these hosting arrangements.

[Catalog Management]

As described above, in certain examples each instance of the marketplace platform may include a catalog management platform 150/250. The catalog management platforms 150/250 may allow the marketplace operator and/or the resellers to manage the content of their catalogs. In particular, the catalog management platforms 150/250 may provide a user interface whereby the marketplace operator and/or the resellers may make selections, adjust values, set policies, and so on with respect to their respective catalogs. For example, the operators may be able to: set or change commercial terms (such as price) for certain offerings within their catalog; create new offerings of their own services; create new bundled offerings by bundling other offering, change descriptions related to certain offerings; set access policies for which resellers or customers may access the catalog and/or which specific offerings are visible to which customer's/resellers; set aggregation policies for which offerings may be aggregated by downstream entities (e.g., resellers/sub-resellers); set synchronization polices for which content is synced for a given offering, when it is synced, and whether in which direction(s) it is synced; set bundling policies for which offerings may be bundled by downstream entities and with what dependencies; set sub-reselling policies for which offerings (if any) a reseller may allow to be further resold by a sub-reseller as well as under what terms and by whom it may be sub-resold; set change policies for who can delete or modify offerings; set approval policies for what needs to be approved before an offering can be fulfilled (e.g. in an enterprise there may be an approval needed, or there may need to be a check that the customer has satisfied dependencies or other conditions). The interface provided by the catalog management platforms 150/250 may also allow the marketplace operator and/or resellers to control various other aspects of their respective instances, such as adjusting the look and feel of their respective customer portals 130/230.

[Example Reseller and Sub-Reseller Management Platforms]

The reseller management platform 400 may be configured to control onboarding of resellers, control the creation and/or association of a reseller marketplace platform 200 with an onboarded reseller, and manage policies with regard to the reseller marketplace platforms 200. The sub-reseller management platforms 401 may be distinct instances of the instructions (or a subset thereof) that make up the reseller management platform 400, and may be for controlling onboarding of sub-resellers (downstream resellers) if and as permitted by the reseller management platform 400, controlling the creation and/or association of a reseller marketplace platform 202 with an onboarded sub-reseller, and managing policies with regard to the sub-reseller marketplace platforms 202 (subject to the ultimate control of the reseller management platform 400). Because the sub-reseller management platforms 401 may be similar in structure to the reseller management platform 400, the discussion below will focus on the reseller management platform 400, but it should be understood that the descriptions apply to the sub-reseller management platforms 401 as well.

The reseller management platform 400 may onboard a prospective reseller to the aggregated marketplace in response a received request to become a reseller. In this context, a reseller is "onboarded" to the aggregated marketplace when the aggregated marketplace platform 100 regards the reseller as an authorized reseller, and therefore grants an instance of the reseller marketplace platform 200 associated with the reseller permission to access the master catalog 120 and aggregate it into the reseller's reseller catalog 220. Note that the reseller management platform 400 controls onboarding in that it has the final say as to whether or not the aggregated marketplace platform 100 will regard a reseller as an authorized reseller, but this does not mean that the reseller management platform 400 necessarily initiates the onboarding or performs all the operations pertaining thereto.

Other operations pertaining to onboarding that the reseller management platform 400 may perform may include coming to an agreement as to commercial terms and reseller policies (which may include the reseller implicitly or explicitly accepting default terms with or without negotiation), and exchanging information that may be needed for instance of the reseller marketplace platform 200 of the reseller to access the master catalog 120 (such as the identity of the reseller, billing information, access information such as an API address, etc.). Such operations may be jointly managed by the reseller management platform 400 and the reseller.

Above, onboarding of resellers to the aggregated marketplace under the control of the reseller management platform 400 is described, but it should be understood that other types of onboarding may be carried out in the systems 10, 11. In particular, each entity in the system 10, 11 may be "onboarded" to another entity in the system (e.g., service vendors 300 may be onboarded to the aggregated marketplace, down-stream resellers may be onboarded to an upstream reseller's marketplace, etc.), and therefore each entity in the system 10, 11 may include instructions that may be configured to facilitate such other onboardings which may be in addition to the reseller management platform 400 or the sub-reseller management platforms 401. For example the service vendors 300 may have their own onboarding instructions (not illustrated) that may participate in their being onboarded to the aggregate marketplace and/or to a reseller's marketplace. As another example, each instance of the marketplace platform may include onboarding instructions (not illustrated) for onboarding service vendors 300 to the aggregated marketplace or reseller's marketplace, which instructions may be separate from the reseller management platform 400 or the sub-reseller management platforms 401.

Multiple platforms or sets of instructions may be used by the various entities to facilitate onboarding, depending on which other entity is being onboarded. For example, the marketplace platform instances may each include instructions (not illustrated) for onboarding entities that are upstream from the respective instance, and additional instructions (such as the reseller management platform 400) may be provided for onboarding entities that are downstream from the respective instance. For example the aggregated marketplace platform 100 may include instructions for onboarding service vendors 300 to the aggregated marketplace, while the reseller management platform 400 may control onboarding of the resellers to the aggregated marketplace. Similarly, for example, the instances of the reseller marketplace platform 200 may include instructions for onboarding service vendors 300 to the respective reseller's marketplace, while a sub-reseller management platform 401 may control onboarding or sub-resellers to the reseller's marketplace.

In certain examples, each instance of the marketplace platform (which includes the aggregated marketplace platform 100 and the reseller marketplace platforms 200) may include instructions for onboarding upstream entities that may correspond to the onboarding instructions of existing marketplace platforms, such as, for example, the "onboarding platform 206" described US 2016/0125489 A1 (see, for example, paragraphs [0036]-[0052]). In certain of these examples, the reseller management platform 400 may leverage such existing onboarding instructions in the aggregate marketplace instance 100 to facilitate the onboarding of resellers. For example, such existing onboarding instructions in an instance of a reseller marketplace platform 200 may be used to onboard the reseller to the aggregated marketplace, subject to the ultimate control of the reseller management platform 400. In some such examples, the reseller management platform 400 may simply decide whether or not to allow the onboarding to proceed, and the onboarding instructions of the reseller marketplace platform 200 may manage the rest of the onboarding in a similar manner to how service vendors are onboarded in US 2016/0125489 A1 (see, for example, paragraphs [0036]-[0052]).

Upon a reseller being onboarded (or during the onboarding), the reseller management platform 400 may associate an instance of the reseller marketplace platform 200 with the reseller. Then, the master catalog 120 may be aggregated into the reseller catalog 220 of the instance of the reseller marketplace platform 200 according to the polices set by the reseller management platform 400 and/or policies set by the instance of the reseller marketplace platform 200. In some examples, associating an instance of the reseller marketplace platform 200 with a reseller may include creating a new instance and recording that the instance is associated with the reseller and has permission to access the master catalog 120. In such examples, the reseller management platform 400 may generate a message that instructs the appropriate device (such as a hypervisor) to create an instance of the reseller marketplace platform 200. In other examples, instances of the reseller marketplace platform 200 may already be extant before the reseller is onboarded, in which case associating an instance of the reseller marketplace platform 200 with a reseller may include recording that the instance is associated with the reseller and has permission to access the master catalog 120. For example, the marketplace operator may keep multiple instances of the reseller marketplace platform 200 running continually, and may associate and/or disassociate respective instances with resellers as the need arises. As another example, a reseller may create their own instance of the reseller marketplace platform 200, and in which case associating this instance with the reseller may comprise the aggregated marketplace platform 100 recording that the instance is associated with the reseller. As described above, the instances may be created statically or dynamically. Once created, they may be run or hosted by the marketplace operator or by the resellers.

As noted above, the reseller management platform 400 may also be configured to manage policies with regard to the reseller marketplace platforms 200. The reseller management platform 400 may include an interface for allowing the marketplace operator to make selections, set or adjust values, and otherwise control the various polices. For example, the marketplace operator may set policies via the reseller management platform 400 that may control whether a reseller may have a sub-reseller, as well who may be a sub-reseller and on what terms. As another example, the marketplace operator may set policies via the reseller management platform 400 that may manage which instance of reseller marketplace platforms 200 are associated with which resellers and/or may control creation and/or tearing down of such instances. As another example, the marketplace operator may set policies via the reseller management platform 400 that may control any aspect related to aggregating the offerings, such as: which offerings of the master catalog 120 may be aggregated (and/or by which resellers they may be aggregated), which portions of aggregated offering may be and/or must be synced, which (if any) commercial terms the resellers are allowed to change, and the like. The policies may vary from one reseller to the next. Moreover, certain policies that are set by the reseller management platform 400 for certain offerings may be controlled by agreements between the marketplace operator and the service vendors 300. For example, a service vendor 300 may specify whether an offering may be resold, whether terms may be altered and who may alter them (e.g., the marketplace vendor may alter price but a reseller may not), and so on.

The systems 10, 11 may include a framework for creating, running (hosting), maintaining, and tearing down instances of the marketplace platform, which may include, for example, hypervisors, operating systems, container controllers, and of course the underlying hardware (e.g., processing circuitry, storage, etc.). In certain examples, the reseller management platform 400 may participate in controlling these operations with respect to either or both the reseller instances and the first instance. For example, the reseller management platform 400 may instruct the framework (e.g., hypervisor) to create and tear down instances. For example, in the case of dynamic creation, the reseller management platform 400 may cause data from an instance (e.g., its catalog) to be stored upon tearing it down, and when the instance is created anew the data may be loaded back into the instance. For example, in the case of static creation, existing instances may be disassociated with resellers and associated with new resellers under the direction of the reseller management platform 400.

It should be noted that certain settings/policies may be controlled by either or both of the catalog management platforms 150/250 and the reseller/sub-reseller management platforms 400/401. Thus, when a particular setting/policy is described herein to be controlled by the catalog management platforms 150/250 and the reseller/sub-reseller management platforms 400/401, this should be understood to mean that in certain examples the catalog management platforms 150/250 control the setting/policy, in certain examples the reseller/sub-reseller management platforms 400/401 control the setting/policy, and in certain examples both the catalog management platforms 150/250 and the reseller/sub-reseller management platforms 400/401 control various aspects of the setting/policy. In certain examples, the catalog management platforms 150/250 may control certain policies on a per-offering basis via the metadata that is included with each offering (e.g., setting whether a particular offering may be aggregated by a reseller), while in certain examples the reseller/sub-reseller management platforms 400/401 may control reseller-wide policies (e.g., setting whether a particular reseller is allowed to have any sub-resellers at all). Thus, for example, the catalog management platforms 150/ 250 and the reseller/sub-reseller management platforms 400/ 401, may both participate in controlling sub-reseller policy in that the catalog management platforms 150/250 may control which particular offerings may be sub-resold while the reseller/sub-reseller management platforms 400/401 may control which resellers may have sub-reseller.

[Example Billing and Settlement Platform]

As illustrated in FIG. 2, the system 11 may include a billing and settlement platform 500 that is associated with the operator of the aggregated marketplace platform 100. In addition, in certain examples each reseller may also have a billing and settlement platform 501. In certain examples, each service vendor 300 may also have a billing and settlement platform 303. In certain examples, a service provider (which may or may not also be one of the service vendors 300, the marketplace operator, or the resellers), may also have a billing platform and settlement platform (not illustrated). The billing and settlement platforms 500, 501, and/or 303 may automatically control billing of customers for purchased offerings, as well as controlling settling between the service vendors 300, the marketplace operator, and the resellers based on their respective revenue sharing agreements.

Although the billing and settlement platforms of the various entities in the systems 10, 11 do not necessarily have to be instances of the same platform, in certain examples various billing and settlement platforms are all instance of the same platform (e.g., the billing and settlement platform 500 is a distinct instance of the same platform as the billing and settlement platforms 501). In certain examples, the instances of the billing and settlement platforms 501 associated with resellers, the instances of the billing and settlement platforms 303 associated with service vendors 300, and/or the instances of the billing and settlement platforms of service providers may all be provided by the marketplace operator for the respective resellers, service vendors 300, and/or service provides.

In a first example arrangement, when a purchase is made at an entity, that entity's and billing and settlement platform 500, 501, or 303 is to automatically bill the customer for the purchase, and then that entity settles with the other entities according to their respective revenue sharing agreements. In a second example arrangement, certain entities (such as the marketplace operator, a service provider, etc.) may bill customers for certain purchases that may have been made at another entity (such as at a reseller), and then the billing entity settles with the other entities according to their respective revenue sharing agreements. These example arrangements, it may be the case that a service provider of a purchased service may bill the customer directly, and then the service provider may settle with the other entities. In any of these example arrangements, the intra-entity settlement after the billing of the customer may be initiated by the billing entity, or by any of the other entities. For certain purchases, there may be no revenue sharing agreement (e.g., for an offering in a reseller's catalog that is the reseller's own offering), and thus settlement may be omitted for such purchases.

For example, suppose that an offering originating from the service vendor 300_1 is purchased at the reseller marketplace platform 200_1 and the first example billing arrangement is used. In response to the purchase (a billing event), the billing and settlement platform 501_1 of the reseller may automatically bill the customer, then the reseller and the marketplace operator may settle, and then the marketplace operator and the service vendor 300_1 may settle. For example, the billing and settlement platform 500 of the marketplace operator may become aware of this billing event (either because the billing and settlement platform 501_1 of the reseller notified it, or by other means), and may generate an invoice for the reseller according to their revenue sharing agreement. As another example, the billing and settlement platform 501_1 of the reseller may automatically remit a payment to the marketplace operator according to the revenue sharing agreement without waiting to be invoiced by the marketplace operator. Similarly, the billing and settlement platform 500 of the marketplace operator may automatically remit payment to the service vendor 300_1, or the service vendor 300_1 may invoice the marketplace operator (e.g., via a billing platform 303_1).

As another example, suppose that an offering originating from the service vendor 300_1 is purchased at the reseller marketplace platform 200_1 and the second example billing arrangement is used. In response to the purchase, for example the billing and settlement platform 500 of the marketplace operator may automatically bill the customer, and then the marketplace operator may settle thereafter with the reseller and the service vendor 300_1. For example, the billing and settlement platform 501_1 of the reseller may become aware of this billing event (either because the billing and settlement platform 500 of the marketplace operator notified it, or by other means), and may generate an invoice for the marketplace operator according to their revenue sharing agreement. As another example, the billing and settlement platform 500 of the marketplace operator may automatically remit a payment to the reseller according to the revenue sharing agreement without waiting to be invoiced by the reseller. Similarly, the billing and settlement platform 500 of the marketplace operator may automatically remit payment to the service vendor 300_1, or the service vendor 300_1 may invoice the marketplace operator (e.g., via a billing platform 303_1).

Billing a customer may include collecting payment at the time of purchase, or sending an invoice at a later date. For subscription services, billing the customer may include repeated billing events and settlements. In addition, for subscription services the billing of the customer may include ongoing monitoring of the service, such as to monitor an amount of use for pay-per-use services and so on.

[Example Machine Readable Instructions and Platforms]

Figure 4:
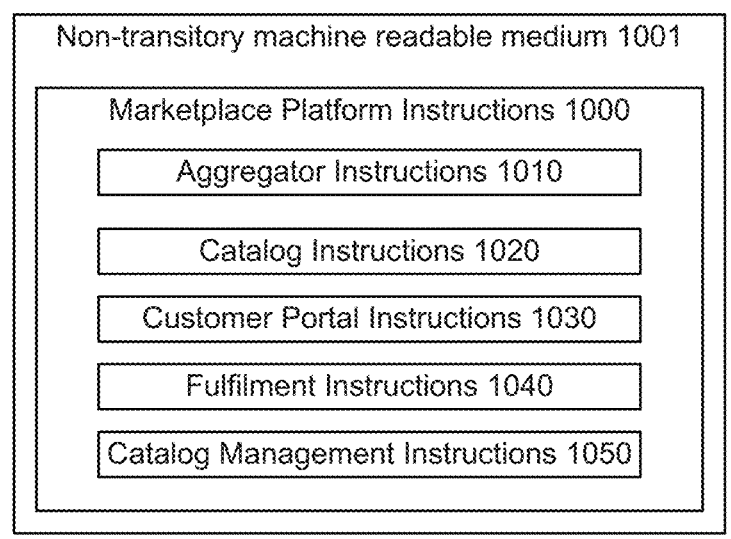
FIG. 4 illustrates example non-transitory machine readable media storing example marketplace platform instructions.

FIG. 4 illustrates example marketplace platform instructions 1000 stored in a non-transitory machine readable medium 1001. An instance of the marketplace platform instructions 1000 is an instance of the marketplace platform described above. Thus, for example, the aggregated marketplace platform 100 and each instance of the reseller marketplace platform 200 may be a distinct instance of the marketplace platform instructions 1000.

The non-transitory machine readable medium 1001 may be any non-transitory machine readable storage, including volatile storage, non-volatile storage, random-access memory (RAM), flash storage, hard disk drives, etc. The non-transitory machine readable medium 1001 may also be virtualized. In certain examples, an instance of the non-transitory machine readable medium 1001 may be included in the each of the infrastructures 160 and 260_1 through 260_M.

An instance of the marketplace platform instructions 1000 may be run (executed, hosted, etc.) by processing circuitry. Processing circuitry may include any combination of hardware, which may or may not be virtualized, that is capable of executing machine readable instructions, such as processors (e.g., CPUs), microprocessors, etc. In particular, the infrastructures 160 and 260_1 through 260_M may include processing circuitry that may be used to execute the marketplace platform instructions 1000.

The example marketplace platform instructions 1000 may include aggregator instructions 1010 that, when executed, cause the run-time instance of the marketplace platform to aggregate an input catalog or input catalogs into the aggregated catalog of the instance of the marketplace platform, for example in the manner described above and in US 2015/0161681 A1 (for example, paragraphs [0015]-[0018], [0021]-[0022]) and US 2016/0125489 A1 (for example, paragraphs [0017]-[0026]). The aggregator instructions 1010 correspond to the aggregators 110/210 described above.

The example marketplace platform instructions 1000 may include catalog instructions 1020. The catalog instructions 1020 may include instructions specifying the structure of the aggregated catalog 120/220. The catalog instructions 1020 may also include instructions making the aggregated catalog available for aggregation by other instances of the marketplace platform (for example, subject to the control of the reseller management platform 400).

The example marketplace platform instructions 1000 may include customer portal instructions 1030 that, when executed, cause the marketplace platform to create a customer portal, such as the portals 130/230 described above. For example, the customer portal may be the "portal 112" described in US 2015/0161681 A1 and/or the "portal platform 212" described in US 2016/0125489 A1. As another example, the customer portal may be part of a cloud controller platform, such as for example CSA and vRealize. Such cloud controller platforms may automatically include or describe in their portal content artifacts and dependencies for the services that are offered in each offering, and therefore in examples that use a cloud controller platform as the customer portal, a customer may know with certainly whether the services that are offered will be able to run on the cloud controller deployed by a desired host of the service (such as the customer, the reseller, the marketplace operator, the service vendor, a third-party service provider, etc.).

The example marketplace portal instructions 1000 may include fulfillment instructions 1040 that, when executed, cause the marketplace platform to fulfill purchased orders, for example in the manner described above and in US 2015/0161681 A1 (see, for example, paragraphs [0030]-0103]), US 2016/0125489 A1 (see, for example, paragraphs [0028]-[0033], [0061], and [0082]), and U.S. patent application Ser. No. 15/282,355. These instructions 1040 correspond to the fulfillment platforms 140/240 described above.

The example marketplace platform instructions 1000 may include catalog management instructions 1030 that, when executed, cause the marketplace platform to create a platform for managing a catalog, such as the catalog management platforms 150/250 described above. The catalog management platforms 150/250 may include an interface that allows an operator of the corresponding instance of the marketplace platform to make changes regarding managing the catalog. For example, the marketplace operator may use the catalog management platform 150 to (subject, perhaps, to constraints from service vendors 300): control which offerings the aggregated marketplace platform 100 aggregates into the master catalog 120, create bundles, set or alter commercial terms for offerings, and so on. Examples of various catalog management operations that the instructions 1030 may cause to be performed are described, for example, in US 2015/0161681 A1 (see, for example, the "administration portal 111", the "widgets 210", and paragraphs

[0020]-[0022] and [0045]) and US 2016/0125489 A1 (see, for example, paragraphs [0023]-[0026] and [0050]).

Figure 5:
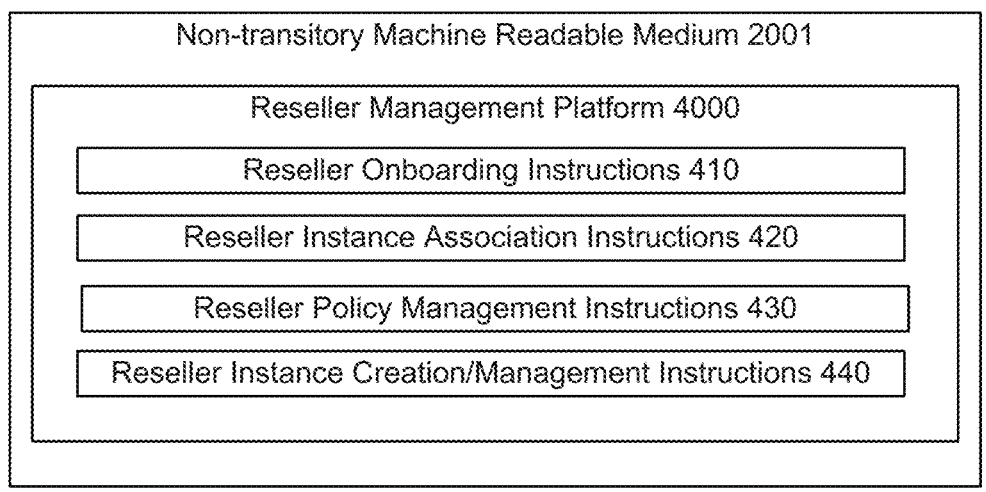
FIG. 5 illustrates example non-transitory machine readable media storing example reseller management platform instructions.

FIG. 5 illustrates example reseller management platform instructions 4000, which are stored on non-transitory machine readable medium 2001. The reseller management platform instructions 4000 correspond to the reseller management platform 400. Non-transitory machine readable medium 2001 may be part of the same storage device as non-transitory machine readable mediums 1001 and/or 3001, or may be part of a different storage device.

The example reseller management platform instructions 4000 may include reseller onboarding instructions 410 that are to control onboarding of resellers in the manner described above.

The example reseller management platform instructions 4000 may include reseller instance association instructions 420 that that are to control association of a reseller instance with a reseller. The reseller instance association platform 420 may associate a reseller, after or during onboarding, with an instance of a reseller marketplace platform 200, in the manner described above.

The example reseller management platform instructions 4000 may include reseller policy management instructions 430 that are to control policies regarding resellers. For example, the reseller policy management instructions 430 may provide an interface for the marketplace operator to set policies regarding resellers and may enforce such policies against resellers. For example, the reseller policy management instructions 430 may allow the marketplace operator to set policies on an offer-by-offer and/or on a reseller-by-reseller basis. For example, the reseller policy management instructions 430 may allow the marketplace operator to set: a pricing policy (e.g., what the price for an offering is, whether the reseller can alter the price, a range of acceptable prices the reseller may set, etc.); a bundling policy (e.g., whether the reseller may create bundles, which offerings (or types of offerings) may be bundled, etc.); an offering aggregation policy (e.g., which offerings (or types of offerings) the reseller is permitted to aggregate; which content from aggregated offerings may and/or must be synced); a sub-reselling policy (e.g., whether the reseller is permitted to have a down-stream reseller that resells offerings from the reseller's catalog, the commercial terms that the reseller may and/or must impose on any down-stream resellers, the policies that the reseller may and/or must enforce on down-stream resellers, etc.); a revenue sharing policy; a billing policy; a sales policy (e.g., who may be sold to, permissible and/or mandatory sales practices, etc.); and so on.

Figure 6:
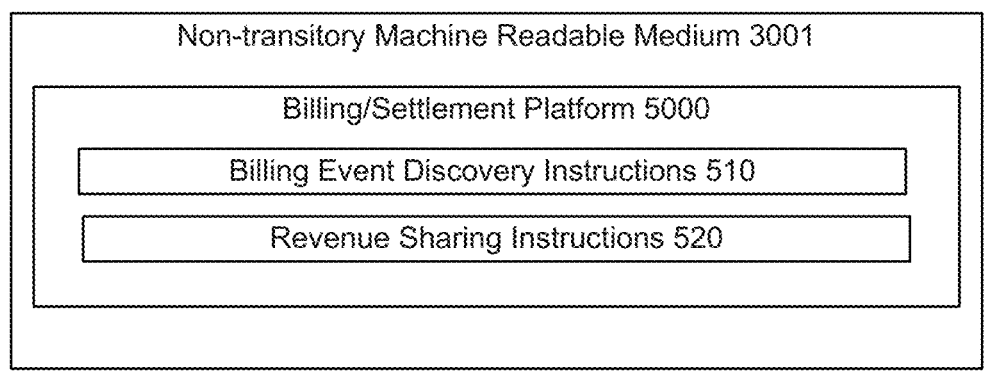
FIG. 6 illustrates example non-transitory machine readable media storing example billing/settlement platform instructions.

FIG. 6 illustrates example billing/settlement platform instructions 5000, which are stored on non-transitory machine readable medium 3001. The billing/settlement platform instructions 5000 correspond to the billing/settlement platform 500. Non-transitory machine readable medium 3001 may be part of the same storage device as non-transitory machine readable medium 1001 and/or 2001, or may be part of a different storage device.

The example settlement platform instructions 5000 may include billing event discovery instructions 510. The billing event discovery instructions 510 may include instructions to discover that a billing event has occurred. A billing event may be, for example, a purchase, a recurring payment (e.g., subscription), etc. For example, the billing event discovery instructions 510 may discover such events by being notified of such events from other entities. As another example, the billing event discovery instructions 510 may discover such events by deducing their occurrence from available information—for example, the fact that a fulfillment process for an offering has been initiated may imply that a purchase has been made.

The example settlement platform instructions 5000 may include revenue sharing instructions 520. The revenue sharing instructions 520 may, in response to a billing event, cause the billing/settlement platform 500 to automatically bill a customer for a purchase, or settle with another entity in the system according to a revenue sharing agreement. The revenue sharing instructions 520 may, for example, implement one of the two arraignments for billing/settlement that were described above, and may determine whether to bill a customer or settle with another entity in the system based on the nature of the billing event and which billing arrangement has been adopted. It is possible for different billing arrangements to be adopted between different entities (e.g., the marketplace operator and a first reseller may use one billing arrangement, while the marketplace operator and a second reseller use another billing arrangement).

[Example Method]

Figure 7:
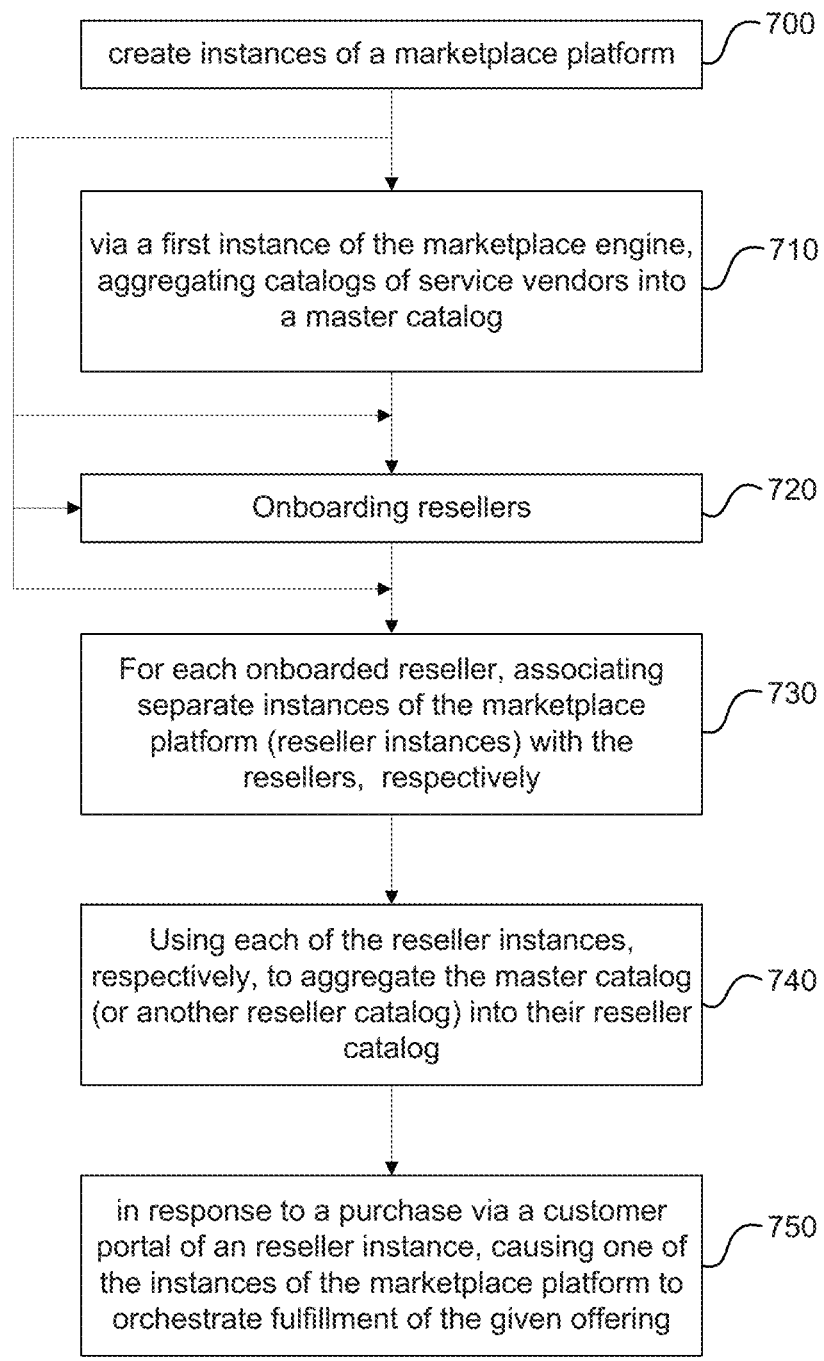
FIG. 7 illustrates an example process flow diagram illustrating an example method of using instances of example marketplace platforms to support reselling.

FIG. 7 illustrates an example method. In block 700, instances of a marketplace platform are created. For example, each instance of the marketplace platform may be such that, when it is executed by processing circuitry, it aggregates input catalogs into an aggregated catalog of the respective instance. Moreover, each instance of the marketplace platform may includes a customer portal that is to present offerings of the corresponding master catalog for sale to users. For example, any of the example marketplace platforms described above may be used. The instances of the marketplace platform may be created, for example, in a cloud of a marketplace operator. Moreover, the instances of the marketplace platform may be separate instances of a virtual appliance or separate instances of a container or set of containers. The first instance of the marketplace platform may include a catalog management tool, which may provide the capability for the marketplace operator to: select which offerings of service vendor catalogs are synchronized with the first catalog, create an offering in the first catalog by bundling offerings of the service vendor catalogs, set a term of sale for an offering of the first catalog, and/or include their own offerings in the first catalog. The instances of the marketplace platform may also include a catalog management tool, which may provide the capability for an operator thereof to: select which offerings of input catalogs are synchronized with their aggregated catalog, create an offering in their aggregated catalog (e.g., by bundling offerings), set a term of sale for an offering of their aggregated catalog, and/or include their own offerings in their aggregated catalog. Note that the creation of the instances may be static or dynamic, as described above. Moreover, the instances of the marketplace platform are not necessarily created at the same time; for example, reseller instances may be created at the same time as the first instance, after the first instance but before onboarding of resellers, during the onboarding of resellers, or as part of associating the reseller instance with a reseller.

In block 710, a first instance of a marketplace platform is used to aggregate multiple catalogs of service vendors into the aggregated catalog of the first instance of the marketplace platform, which may be referred to as the "master catalog" to distinguish it from the aggregated catalogs of other instances of the marketplace platform.

In block 720, resellers are onboarded. For example, a reseller management platform such as the reseller management platform 400 may be used to control onboarding of the resellers, in the manner described above. Block 710 may further include setting and/or enforcing polices for resellers, for example in the manner described above.

In block 730, an onboarded (or onboarding) reseller is associated with a second instance of the marketplace platform. The associating of the instance of the marketplace platform with the reseller may occur after the reseller is onboarded, or during onboarding of the reseller. For example, an instance of any of the example marketplace platforms described above may be used as the second instance of the marketplace platform in block 720. Block 720 may be repeated for each onboarded (onboarding) reseller, with each reseller being associated with their own separate instance of the marketplace platform. Thus, in block 702, for each onboarded (onboarding) reseller, separate instances of the marketplace platform (reseller instances) are associated with the resellers, respectively.

In block 740, once the reseller instances of the marketplace platform are associated with their respective resellers and onboarding is complete, the master catalog may be aggregated into the respective aggregated catalogs of the reseller instances (the "reseller catalogs"). The aggregating of the master catalog into the reseller catalog may be performed in the manner described above.

Block 740 may further include setting policies for each instance of the reseller-marketplace platform, which may include: a pricing policy, a bundling policy, an offering aggregation policy, a sub-reselling policy, etc.

In block 750, customer purchases are fulfilled. In particular, in response to a purchase via a customer portal of a reseller instance, one of the instances of the marketplace platform is caused to orchestrate fulfillment of the given offering, in the manner described above.

As used herein, a "platform" comprises a set of machine readable instructions that may be executed by processing circuitry (such as a processor). For example, a software application is an example of a platform. As another example, a virtual appliance is an example of a platform. As another example, a container or set of containers is an example of a platform.

An instance of a platform may be "created" or "formed" or the like by, for example, generating machine readable code that corresponds to the platform. For example, an instance of a platform may be created by copying the set of machine readable instruction corresponding to an already existing instance of the platform.

A set of machine readable instructions may be divided (conceptually, and/or literally) into various sub-sets of machine readable instructions, and therefore a given "platform" may be said to include within itself further "platform" (for example, the aggregated marketplace platform 100 of FIG. 1 includes an aggregator platform 110). Such references to a second "platform" within a first "platform" should be understood to mean merely that the machine readable instructions corresponding to the first platform includes a subset of instructions corresponding to the second platform, and should not be interpreted to imply any sort of literal or logical divisions within the "platform".

As used herein, a "reseller" of a service is someone who (A) offers the service for sale, and (B) obtained the right to offer the service for sale from (directly or indirectly) the aggregated marketplace platform. In particular, in example systems described herein, an aggregated services-marketplace platform may directly convey the right to offer certain services for sale to a reseller by associating the reseller with an instance of a reseller marketplace platform and allowing the reseller marketplace platform to aggregate the master catalog of the aggregated marketplace platform. Furthermore, resellers who have been onboarded may, if permitted by the aggregated marketplace platform, further convey the right to offer certain services for sale to down-stream resellers in a similar fashion, which may constitute obtaining the right to offer the services indirectly from the aggregated marketplace platform.

As used herein, a "service vendor" is an entity that develops, produces, or creates the service and offers that service for sale. Service vendors may include, for example, entities that produce software that is offered as a SaaS service (e.g., independent software vendors (ISVs)), entities that design packaged cloud solutions (which may comprise a recipe or blue print specifying resources and/or how those resources may be configured and combined together so as to address a specific type of application or use-case), entities that produce IT services, entities that produce telecommunication services, entities that produce cloud services, and so on. The service vendor may or may not be the entity that actually supplies the service to the customer once the service is purchased (the entity that supplies the service to the customer may be referred to herein as the "service provider" of the service). For example, an ISV may produce a software program and offer the program as a SaaS service, but a third-party may actually host the program—in such an example, the ISV is the service vendor and the third-party is the service provider. As another example, suppose the ISV from the previous example hosted the program itself—in such an example, the ISV is both the service vendor and the service provider.

Throughout this disclosure and in the appended claims, occasionally reference may be made to "a number" of items. Such references to "a number" mean any integer greater than or equal to one. When "a number" is used in this way, the word describing the item(s) may be written in pluralized form for grammatical consistency, but this does not necessarily mean that multiple items are being referred to. Thus, for example, a phrase such as "a number of first data bits, wherein the first data bits . . . " could encompass both one first data bit and multiple first data bits, notwithstanding the use of the pluralized form.

The use of "a number" in the manner described above should not be interpreted to mean that items that are referred to without the phrase "a number" are necessarily singular. In particular, when items are referred to using the articles "a", "an", and "the", this should be understood to mean that there is "at least one" of the item, unless explicitly stated otherwise. When these articles are used in this way, the word describing the item(s) may be written in singular form for grammatical consistency, but this does not necessarily mean that only one items is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included.

While the above disclosure has been shown and described with reference to the foregoing examples, it should be understood that other forms, details, and implementations may be made without departing from the spirit and scope of this disclosure.

What is claimed is:

1. A method performed by a system comprising a hardware processor, comprising:

creating a first instance of a marketplace platform comprising machine readable instructions, wherein the first instance of the marketplace platform is to, when run by processing circuitry, aggregate catalogs of service vendors into a first aggregated catalog of the first instance of the marketplace platform, and the first instance of the marketplace platform includes a first user portal to present services of the first aggregated catalog to users;

onboarding a reseller and associating a second instance of the marketplace platform with the onboarded reseller, the second instance of the marketplace platform comprising a second user portal;

aggregating, by the second instance of the marketplace platform, the first aggregated catalog into a second aggregated catalog of the second instance of the marketplace platform;

presenting services of the second aggregated catalog in the second user portal; and in response to a first service of the second aggregated catalog being purchased via the second user portal, causing the second instance of the marketplace platform to orchestrate fulfillment of the first service.

2. The method of claim 1, wherein each of the first instance of the marketplace platform and the second instance of the marketplace platform is one of: a separate instance of a virtual appliance, a separate instance of a container or set of containers, or a separate installation of a program.

3. The method of claim 1, wherein the first and second instances of the marketplace platform are hosted in a cloud of an operator of the aggregated first instance of the marketplace platform.

4. The method of claim 1, wherein the second instance of the marketplace platform is hosted in an infrastructure of the reseller.

5. The method of claim 1, wherein the second instance of the marketplace platform includes a catalog management tool that allows selection of which services are aggregated into the second aggregated catalog.

6. The method of claim 1, wherein each of the first and second instances of the marketplace platform includes a catalog management tool that allows creation of a service in the respective first aggregated catalog or the second aggregated catalog.

7. The method of claim 1, wherein the second instance of the marketplace platform includes a catalog management tool that allows an operator of the second instance of the marketplace platform to add a service of the operator in the second aggregated catalog.

8. The method of claim 1, further comprising associating a third instance of the marketplace platform with a first service vendor of the service vendors and with a catalog of the first service vendor, wherein the first instance of the marketplace platform is to aggregate the catalog of the first service vendor.

9. The method of claim 1, further comprising:
dynamically creating and tearing down the second instance of the marketplace platform.

10. The method of claim 1, further comprising:
billing a customer for the first service via one of a first billing platform and a second billing platform, the first billing platform being operated by an operator of the first instance of the marketplace platform, and the second billing platform being operated by the reseller; and responsive to the billing for the first service, causing one of the first billing platform and the second billing platform to perform settlement, according to a revenue sharing agreement, between the operator of the first instance of the marketplace platform and the reseller.

11. The method of claim 1, wherein the reseller is distinct from the service vendors and an operator of the first instance of the marketplace platform.

12. A system comprising:
a number of processors;
a first instance of a marketplace platform executable by at least one of the number of processors to aggregate catalogs of service vendors into a master catalog of the first instance of the marketplace platform, the master catalog comprising information of services of the catalogs of the service vendors; and a reseller management platform to onboard a reseller and cause a reseller instance of the marketplace platform to be associated with the reseller, wherein the reseller instance of the marketplace platform comprises a customer portal to present services of a reseller catalog, and the reseller instance of the marketplace platform is executable by at least one of the number of processors to:
aggregate the master catalog into the reseller catalog of the reseller instance of the marketplace platform, the reseller catalog comprising information of services of the master catalog and of other services, and in response to a first service of the reseller catalog being purchased via the customer portal, initiate fulfillment of the first service.

13. The system of claim 12, wherein the first instance of the marketplace platform and the reseller instance of the marketplace platform are separate instances of one of: a virtual appliance, or a container or set of containers.

14. The system of claim 12, wherein the first instance of the marketplace platform and the reseller instance of the marketplace platform are hosted on a shared infrastructure in a cloud of an operator of the first instance of the marketplace platform.

15. The system of claim 12, wherein the reseller is distinct from the service vendors and an operator of the first instance of the marketplace platform.

16. The system of claim 12, wherein the fulfillment of the first service comprises provisioning an infrastructure for execution of the first service.

17. A non-transitory machine readable medium storing instructions that upon execution cause a system to including:
create a first instance of a marketplace platform, and use the first instance of the marketplace platform to aggregate catalogs of service vendors into a master catalog of the first instance of the marketplace platform, the catalogs of the service vendors presenting respective cloud services of the service vendors, and the master catalog presenting the cloud services of the service vendors;

onboard a reseller;
create a reseller instance of the marketplace platform associated with the reseller that has been onboarded, and use the reseller instance of the marketplace platform to aggregate the master catalog into a reseller catalog of the reseller instance of the marketplace platform, the reseller catalog presenting the cloud services of the master catalog and other cloud services; and responsive to a user selection, in a portal, of a first cloud service presented by the reseller catalog, cause fulfillment of the first cloud service by the reseller instance of the marketplace platform.

18. The non-transitory machine readable medium of claim 17, wherein the reseller is distinct from the service vendors and an operator of the first instance of the marketplace platform.

19. The non-transitory machine readable medium of claim 17, wherein the fulfillment of the first cloud service comprises provisioning computer resources for execution of the first cloud service.

* * * * *